(12) United States Patent
Baker

(10) Patent No.: US 6,424,684 B1
(45) Date of Patent: Jul. 23, 2002

(54) METHOD AND APPARATUS FOR RECEIVING SYNCHRONOUS DATA

(75) Inventor: R. Jacob Baker, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/385,348

(22) Filed: Aug. 30, 1999

(51) Int. Cl.⁷ .................................................. H04B 1/06
(52) U.S. Cl. ........................... 375/340; 327/64; 327/73; 327/87; 329/311
(58) Field of Search ................................. 375/316, 340; 327/63, 64, 73, 87; 329/311

(56) References Cited

U.S. PATENT DOCUMENTS

| | | | |
|---|---|---|---|
| 4,821,297 A | * | 4/1989 | Bergmann et al. .......... 375/371 |
| 5,105,447 A | * | 4/1992 | Iwane .......................... 375/360 |
| 5,329,554 A | * | 7/1994 | Behrens et al. ................ 360/46 |
| 5,491,729 A | * | 2/1996 | Co et al. ...................... 375/371 |
| 6,081,561 A | * | 6/2000 | Julyan et al. ................. 375/316 |

\* cited by examiner

Primary Examiner—Amanda T. Le
(74) Attorney, Agent, or Firm—Knobbe, Martens, Olson & Bear, LLP

(57) ABSTRACT

A circuit receives data from a high frequency data line. The circuit determines the data value by employing a decision circuit and an over-sampling circuit. The over-sampling circuit captures the data levels on the data line at spaced apart time intervals. The decision circuit employs the data levels captured by the over-sampling circuit and a previously stored value to determine the data level that should be received from the data line.

13 Claims, 7 Drawing Sheets

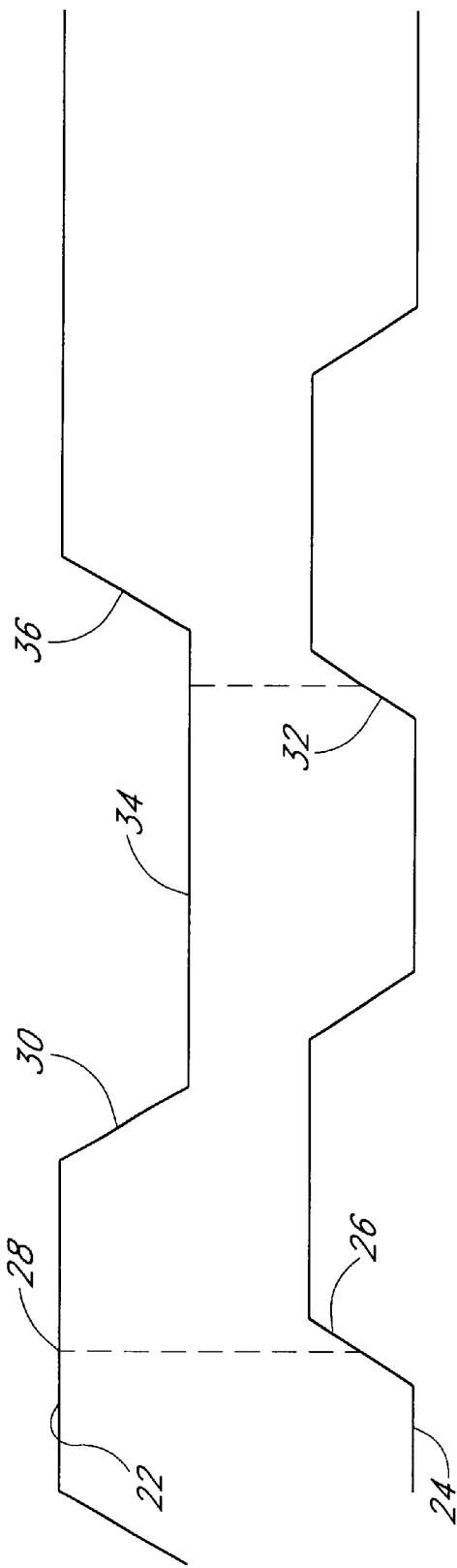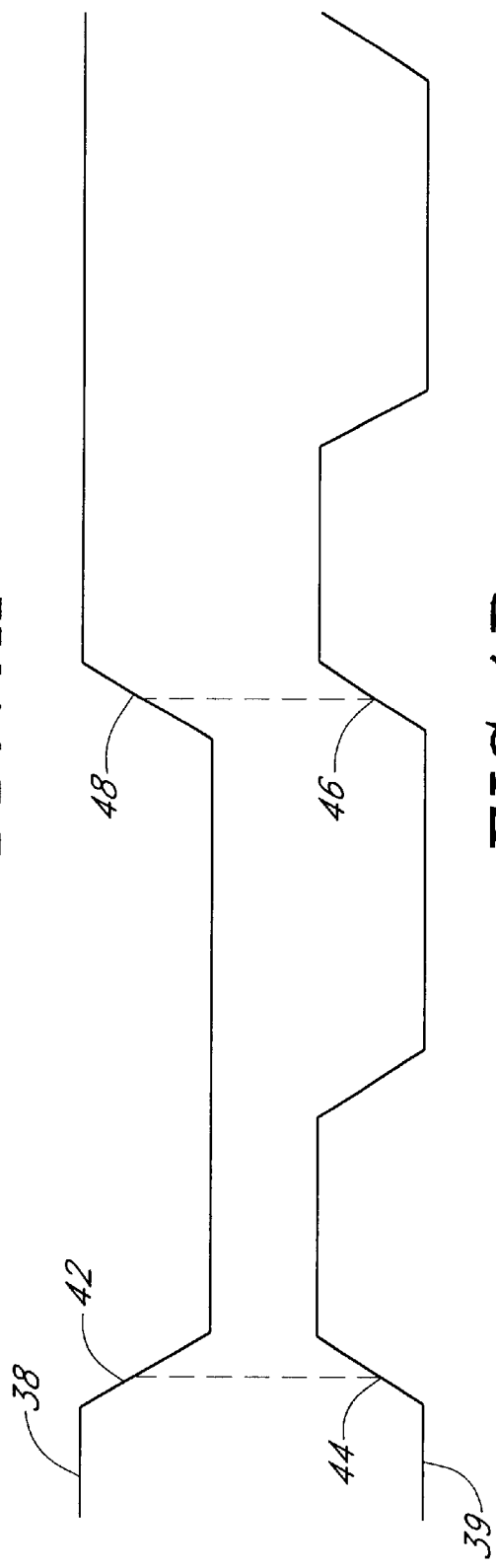

111

111
or
110

110
or
100
or
101
or
010

100
or
000

000

METHOD AND APPARATUS FOR RECEIVING SYNCHRONOUS DATA

BACKGROUND OF THE INVENTION

1. Field of the Invention

The present invention relates to high frequency data transfers. In particular, the present invention relates to a method and apparatus for reliably receiving synchronous data from a high frequency data source.

2. Description of the Related Art

Data movement within a computer system, for example, can take place in an asynchronous mode or in a synchronous mode. Asynchronous data transfers are accomplished by generating special control signals when data are provided on data lines. For example, in an asynchronous data transfer, a strobe signal may be provided when data are on the data lines, such that a sampling edge of the strobe signal (the edge to which the receiving module is responsive) coincides with steady data levels. Synchronous data transfers are accomplished by providing data to lines, such that steady data levels on the lines coincide with a sampling edge of the clock signal to which the data is synchronized. For example, the data may be synchronized to a system clock. During synchronous data transfers, steady-state or level data values are provided on the data lines coincident with the sampling edges of the system clock. The data are allowed to change (i.e., transition) only between adjacent clock sampling edges. Synchronous data operations generally result in data rates that are generally higher than those resulting from asynchronous data operations, especially with transfers of large amounts of data, because of the one-to-one correspondence between clock cycles and data cycles.

Synchronous Dynamic Random Access Memory (hereinafter "SDRAM") is a generic name for various kinds of Dynamic Random Access Memory (hereinafter "DRAM") that are synchronized with the system clock. Data operations employing SDRAMs generally comprise burst operations during which a special control signal is followed by a burst of data.

A by-product of the higher data rate is the reduction in access time that is allotted for each data read cycle or data write cycle. Data are read from or written to the memory module during a shorter time than that which is available in lower rate systems. For example, employing a 100 Mhz system clock, synchronous data that are read on a single edge of the system clock are at a steady state (not transitioning) for much less than 10 ns during a data cycle. During other times, the data are transitioning from a high level to a low level or from a low level to a high level. The sampling edge of the system clock used to read the synchronous data should generally coincide with steady state values of the data so as to capture valid data. Sampling during transitions of the data will generally result in uncertain data values that should not be used. Because of the very fast sampling rate, misalignment of the sampling edge of the system clock and the steady state data signal can result in sampling of data during clock transitions.

Although the clock and the data are synchronized, the sampling edge of the clock signal may occur substantially simultaneously with a data transition such that the clock may gate the state of the data before the transition, gate the state of the data after the transition, or gate an ambiguous state. The sampling edge of the clock signal may align with the data transition because delays in the circuit that generates the sampling clock signal may be different from delays in the circuit that provides the data. Printed circuit board traces have the effect of delaying a signal that is transmitted along the traces. Different length traces provide different delays. The delays are generally not long enough to have a significant effect on lower rate data transfers. Nonetheless, the delays attributed to different length traces may have a significant effect on high rate data transfers. A delay of as little as 2 nanoseconds on a high frequency data line can cause the relative shift of the data such that data transitions occur simultaneously with the sampling edge of the system clock signal. Thus, the outputs of the circuit which gates the data in synchronism with the system clock signal may not present the correct data. Since the outputs of this circuit comprise the data transferred to or from the SDRAM, erroneous data may be transferred. The relative shift of the data transitions in relation to the system clock signal is generally referred to as "data skewing."

Once data skewing becomes severe enough to cause unpredictable data behavior, the condition persists for an extended time interval. Because the data are driven by the same clock signal that is used to control the data sampling, the data transitions are separated by a multiple of clock signal cycles. Thus, once the data transition and a sampling edge of the system clock signal coincide, the next data transition also coincides with the sampling edge of the system clock signal. Therefore, there is a need for a method of reading data from an SDRAM while ensuring that data are correctly received, regardless of data skewing.

SUMMARY OF THE INVENTION

In accordance with the present invention, a receiving circuit receives synchronous data from data lines that are synchronized with a clock signal. The receiving circuit includes an over-sampling circuit. The over-sampling circuit samples the data during at least three time intervals in response to at least one edge of the clock signal. The samples from the module are provided to a decision circuit. The decision circuit determines the data levels provided on the data line by reference to the samples from the over-sampling circuit and by reference to the previous determinations of the decision circuit.

The present invention also provides a method of receiving synchronous data. The method first samples the data level of a data signal line at least three times in response to a sampling edge of a clock signal. The method then determines a least one data value based on the sampled levels and a previously determined data value.

In one embodiment the circuit of the invention is used to receive synchronous data from a data line. The data on the data line are synchronized with a clock signal. The circuit includes an over-sampling circuit, which provides data samples to a decision circuit, and which samples the data at least two times in response to at least one edge of the clock signal. The circuit also includes a decision circuit, which determines the data levels provided on the data line by reference to the samples from the over-sampling circuit and by reference to the previous level determined by the decision circuit.

The present invention further provides for a method of receiving synchronous data. The method includes a first step where the data level of a data signal line is sampled at least two times in response to a sampling edge of a clock signal. The method then continues with a step during which at least one data value is determined on the basis of sampled levels and a previous determination.

BRIEF DESCRIPTION OF THE DRAWINGS

FIG. 1A illustrates the data signal and system clock levels during a properly timed segment of a read operation;

FIG. 1B illustrates the data signal and system clock levels when the data signal is skewed relative to the system clock signal;

DETAILED DESCRIPTION OF THE PREFERRED EMBODIMENT

Figure 2:
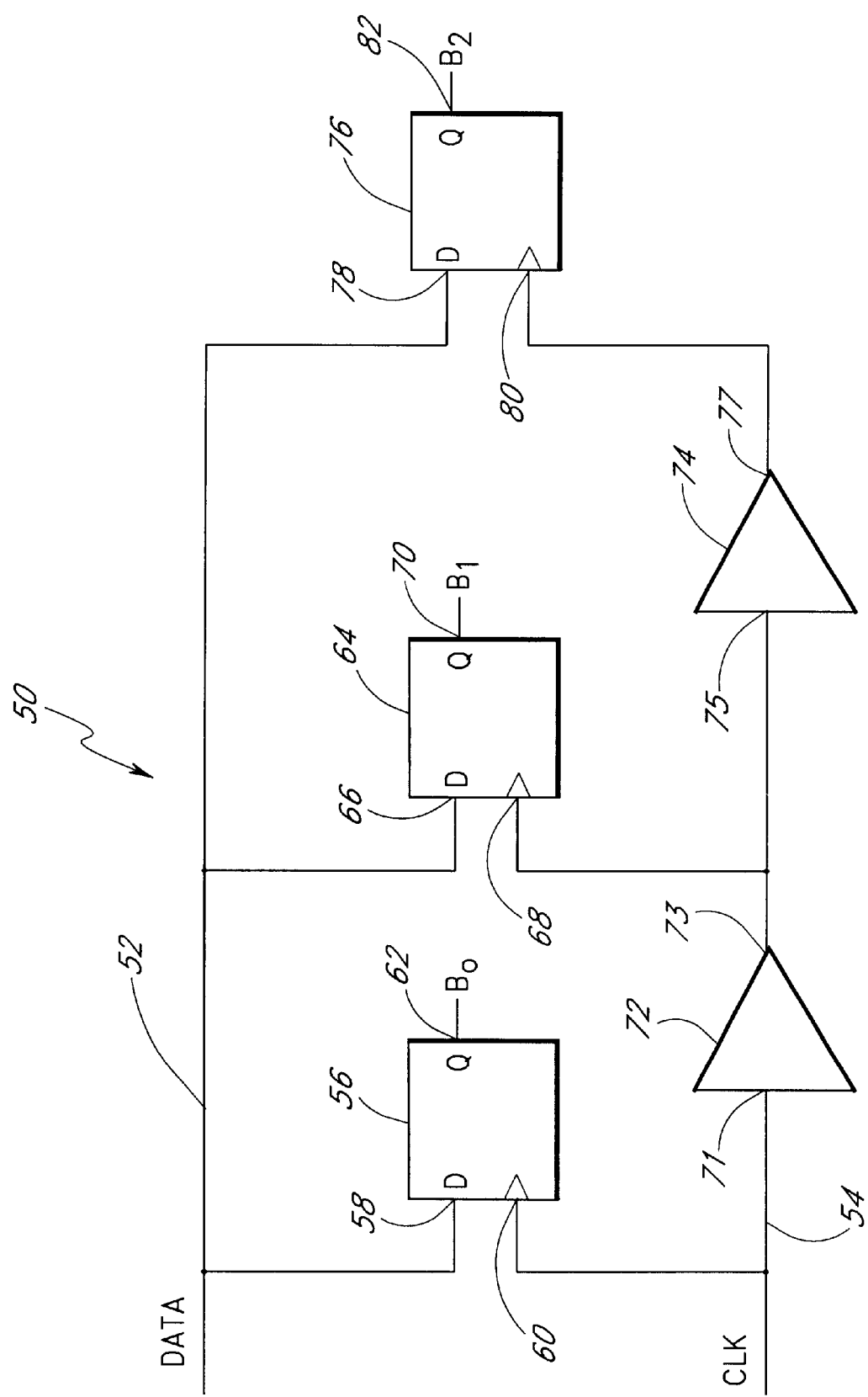
FIG. 2 illustrates a sampling circuit that provides data samples to the decision circuit of the receiving circuit of the present invention.
Figure 3A:
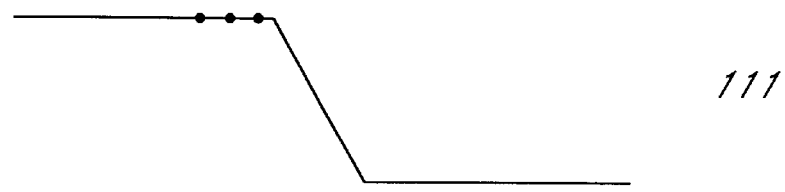
FIGS. 3A–3J illustrate the possible sampling conditions of the sampling circuit of the present invention.
Figure 3B:
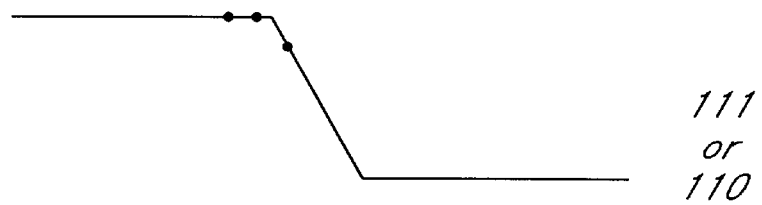
Figure 3C:
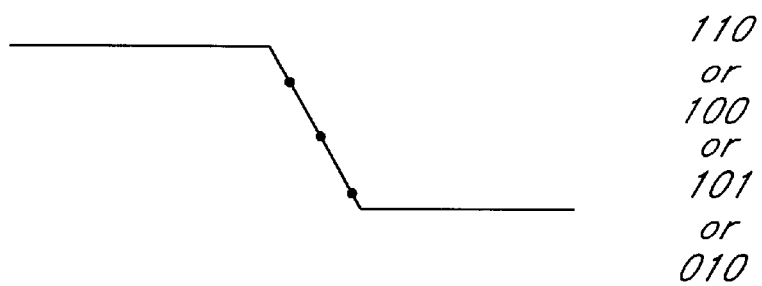
Figure 3D:
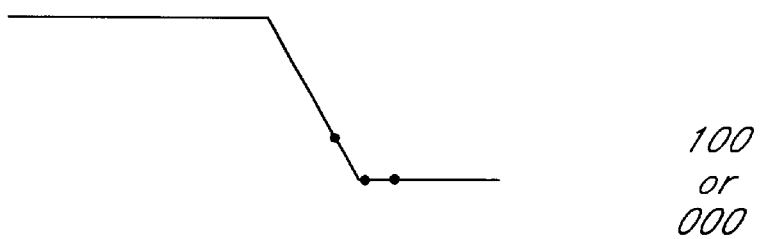
Figure 3E:
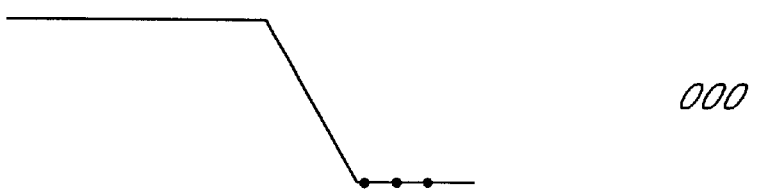
Figure 3F:
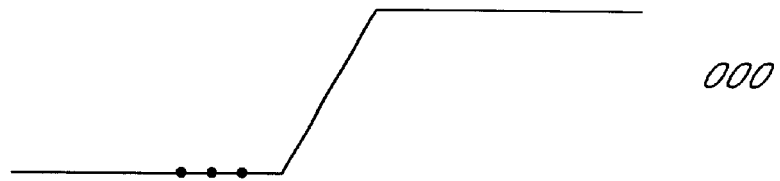
Figure 3G:
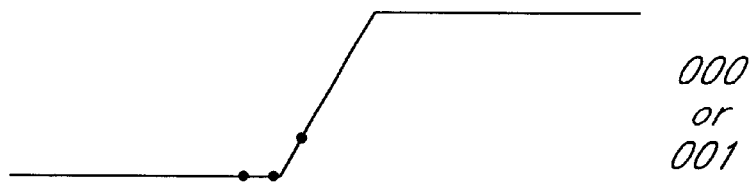
Figure 3H:
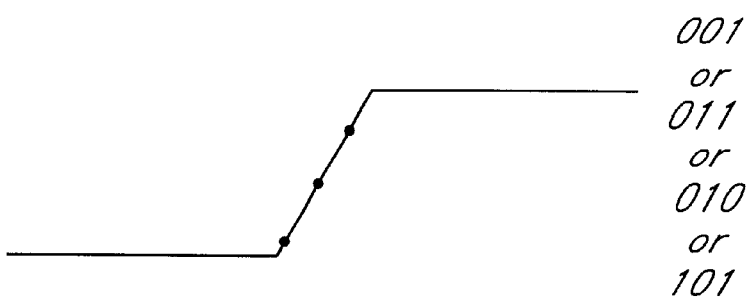
Figure 3I:
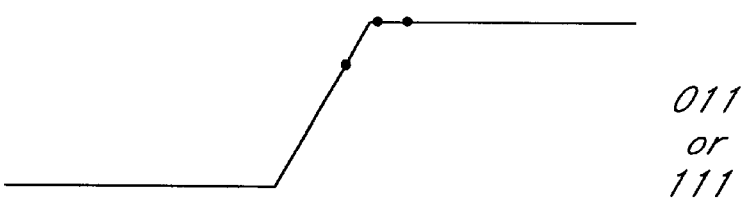
Figure 3J:
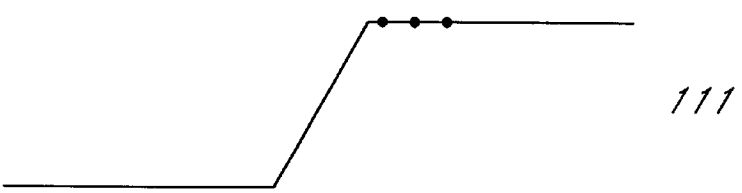

An exemplary method and an exemplary apparatus in accordance with the present invention will now be described with reference to illustrations of an embodiment of a receiving circuit that is used to receive data from an SDRAM. First, a problem that the present invention solves will be discussed. Next, an embodiment of a sampling circuit that is part of the receiving circuit of the present invention will be described. Finally, the structure and operation of a receiving circuit will be described with reference to illustrations of a state machine diagram and a logic diagram.

In the discussion below, "1," and "0" are used to refer to a logical high level and a logical low level of a signal, respectively. Although the illustrated embodiment is a circuit used to provide data to an SDRAM, the disclosure is equally applicable to circuits used to provide data to other elements of a computer system. The signals referred to in the following discussion are assumed to be at any of two logic levels, a high level and a low level. Nevertheless, the discussion below is equally applicable to signals that can have more than two levels.

FIG. 1A illustrates a data signal 22 that may be provided, for example, at the output of an SDRAM. The transitions 30, 36 of the data signal 22 are at least one system clock cycle apart. Thus, no more than one transition in the data signal may occur per clock cycle. In the illustrated example, the sampling edges of the clock signal are the rising edges 26, 32 of the clock signal 24 (transitions from 0 to 1). As may be appreciated, the first sampling edge 26 of the system clock signal 24 coincides with a steady-state level 28 of the data signal 22. The data signal 22 is at a steady-state level because the level 28 is located between the previous transition to the present level and the next transition from the present level. Thus, the level 28 is unambiguously received as a logic 1. As a second example, a low logic level 34 of the data signal 22 is at a steady-state value when the second rising edge 32 of the clock signal 24 occurs. Thus, the level 28 is unambiguously received as a logic 0.

FIG. 1B illustrates a data signal 38 that is skewed in relation to a clock signal 39. The data signal 38 is skewed because the transition 42 of the data signal occurs substantially simultaneously with the sampling edge 44 of the system clock signal 39. As may be appreciated, because the data transitions are synchronized to the system clock signal 39, the next transition 48 of the data signal 38 also occurs substantially simultaneously with the next sampling edge 46 of the system clock signal. Thus, the data that are received from the data line are metastable because the received values depend on the relative timing of the data transitions and the clock transition. For example, the data level read on the first sampling edge 44 of the system clock signal 39 may be a 1 if the sampling edge coincides with the early portion of the data transition 42. Alternatively, the data level read on the same sampling edge 44 of the clock signal 39 may be a 0 if the sampling edge coincides with the later portion of the data transition 42. Whether the data level is read as a 1 or a 0 depends on a number of factors, such as the setup and hold times of the circuit gates and also the rise and fall times of the data signals and the clock signals. Thus, the data that transition substantially simultaneously with the sampling edge are unstable.

When the transition of the data signal and the sampling edge of the clock signal coincide, the correct data value to be received from the data line generally cannot be determined. For example, if the data signal transitions from a 1 to a 0 and the clock edge is late, a 0 may be received; however, a 1 should have been received because the clock should have arrived during the steady-state 1 level before the transition, and therefore should have gated the logical 1 level. On the other hand, if the clock edge is early, a logical 1 may be received; however, a logical 0 should have been received because the clock edge should have arrived after the transition, and therefore should have gated the logical 0 level.

When reading data with a conventional receiving circuit, the relative timing between the clock edge and the direction of data transition, is not known. The only information available is the perceived level on the data signal line when the single sampling edge occurs. Therefore, it is difficult to determine the data value that should correctly be received.

The present invention provides an apparatus and a method for correctly determining the value that should be received from the data line by expanding the view of the receiving circuit in order-to capture a broader snapshot of the levels on the data signal. FIG. 2 illustrates an over-sampling circuit 50 used in cooperation with the determination logic circuit (FIG. 4) of the present invention so as to properly receive data from a high frequency data line.

The over-sampling circuit 50 takes a snapshot of the data signal over a predetermined time period relative to a sampling edge of the system clock signal. The over-sampling circuit 50 includes three latches or flip-flops 56, 64, 76 having respective data inputs 58, 66, 78. The data inputs 58, 66, 78 are coupled to a data input line 52. The clock input 60 of the first latch 56 is coupled to a system clock line 54. The clock input 68 of the second latch 64 is coupled to the output 73 of a first delay element 72. The input 71 of the first delay element 72 is coupled to the system clock line 54. The clock input 80 of the third latch 76 is coupled to the output 77 of a second delay element 74. The input 75 of the second delay element 74 is coupled to the output 73 of the first delay element 72. The outputs 62, 70, 82 of the three latches are respectively coupled to three output signal lines, B0, B1, B2.

The over-sampling circuit of FIG. 2 operates to provide three samples of data for every sampling edge of the system clock by generating three spaced apart sampling edges. The first latch 56 stores the data level that was on the data input line 52 when the sampling edge was asserted. The second latch 64 stores the data level that was on the data input line 52 one delay after the sampling edge because the signal at the clock input 68 of the second memory module is delayed once. The third latch contains the data level that was on the data input line 52 two delays after the sampling edge because the clock signal to the clock input of the third latch is delayed twice. Thus, the three signal lines B0, B1, B2 from the three latches provide three values making up a single snapshot sample of the data input line 52. By analyzing the three sample values and the prior output state of the data, the receiving circuit determines the correct next output state of the data so that all input data states are correctly presented at the output of the circuit.

FIGS. 3A–3J illustrate the data sampling scenarios that may be provided to the over-sampling circuit of the FIG. 2. The figures illustrate the data signal levels near a transition point. The data appearing on the signal line represent the values that are clocked into the over-sampling circuit. When a dot in FIGS. 3A–3J appears on the transition from one level to the another, the value received into the memories of the over-sampling circuit may be either a 0 or a 1. Thus, both possibilities are accounted for, as provided by the potential sample values that appear to the right of the corresponding signal level illustration. Note that when a data line is sampled during a transition from a 1 to a 0 or from a 0 to a 1, it is possible for two latches 56, 64, 76 to store different values for the data level during the transition. Assuming first that all latches 56, 64, 76 have the same setup and hold times and that the sampling clocks and delayed sampling clocks have approximately the same propagation times to the respective clock inputs of the latches, then the three latches should sample the transition sequentially. In particular, as the data line transitions from a logical 1 to a logical 0, the three latches should latch a 110 or a 100. However, because of difference in setup and hold times, differences in propagation delays and differences in thresholds of the latches, it is also possible for the middle latch 64 to receive a different value than the values received by either the first latch 56 or the last latch 76. For example, if the middle latch has a longer setup time, it may continue to detect a 1-to-0 transition as a 1 although the first latch 56 has already detected the level as a 0. Similarly, if the middle latch 64 has a short setup time compared to the last latch 76, the middle latch 64 may detect the level as a 0 although the last latch 76 continues to detect the level as a 1.

It should also be noted that when the sample clock is occurring at substantially the same time as a transition in the data level, it is not readily apparent whether the sample clock is intended to sample the data level that was present before the transition or to sample the data level that is present after the transition. As discussed below, the one aspect of the present invention is to use the data history to determine whether the sampled data should be considered to be a 1 or a 0. By using the history as well as the samples, this aspect of the present invention assures that a particular data level that ends or begins near a transition in the sample clock is not missed. When all three values of a sample are of a single level, such as the samples that may be provided by the sampling conditions of FIGS. 3A, 3E, 3F and 3J, the determined level is the same as that of the three sample values regardless of the history of the circuit. The history becomes important when the values of a sample contain different levels, such as the samples that may be provided by the sampling conditions of FIGS. 3B, 3C, 3D, 3G, 3H, and 3I. The different levels in a single sample, indicate that the data is changing states during the sampling period. One possibility is to cause the output level of the circuit to be the same as the data level measured by the last value in the sample. Another possibility is to cause the output level to be the same as the data level measured by the first value in the sample. Knowing the history of the circuit, the receiving circuit can make the correct determination as to which sample value to use. If the data level of the first value in the sample is the same as the prior output level and the data level of the last value in the sample is opposite the prior output level, then it is presumed that the data level from which the data signal is transitioning has already been detected and that the data level to which the data signal is transitioning is the data value for the current sample. On the other hand, if the data level of the first value in the sample is opposite the prior output level and the data level of the last value in the sample is the same as the prior output level, then it is presumed that the data level from which the data signal is transitioning has not been detected and is therefore taken as the data value for the current sample.

The logic that analyzes the received samples is part of a state machine that utilizes the three values in a sample and the current output of the state machine to determine the next state of the state machine. The state machine is developed by observing that a data line can have a maximum of one transition per clock cycle. Therefore, when a sample from the over-sampling circuit contains a value that is different from the previously determined value, a single transition in the data must have occurred after determining the previous value and before receiving the present sample. The receiving circuit thereby provides an output value that is opposite the previous output value when any of the three samples is opposite of the previously determined value. When none of the samples of the over-sampling circuit has a value that is opposite the previous output value, indicating that the data did not transition during the clock cycle, the determined value provided by the receiving circuit is the same as the previously determined value, as discussed above.

A special case may be provided for samples that are unlikely to be received by the over-sampling circuit but should nonetheless be accounted for. The special case arises when a sample of the over-sampling circuit contains a first value, B0, and a last value, B2, that are of the same logic level, and a middle sample, B1, of the opposite level. Because the data are synchronized with the system clock, a sample having a first value and a last value of the same logical level, with the opposite value in between, should not occur; however, as discussed above, differences in setup and hold times, propagation delay and thresholds can cause the middle sample to be different than either the first sample or the last sample. As set forth below, the different middle sample does not affect the integrity of the data sampling.

Figure 4:
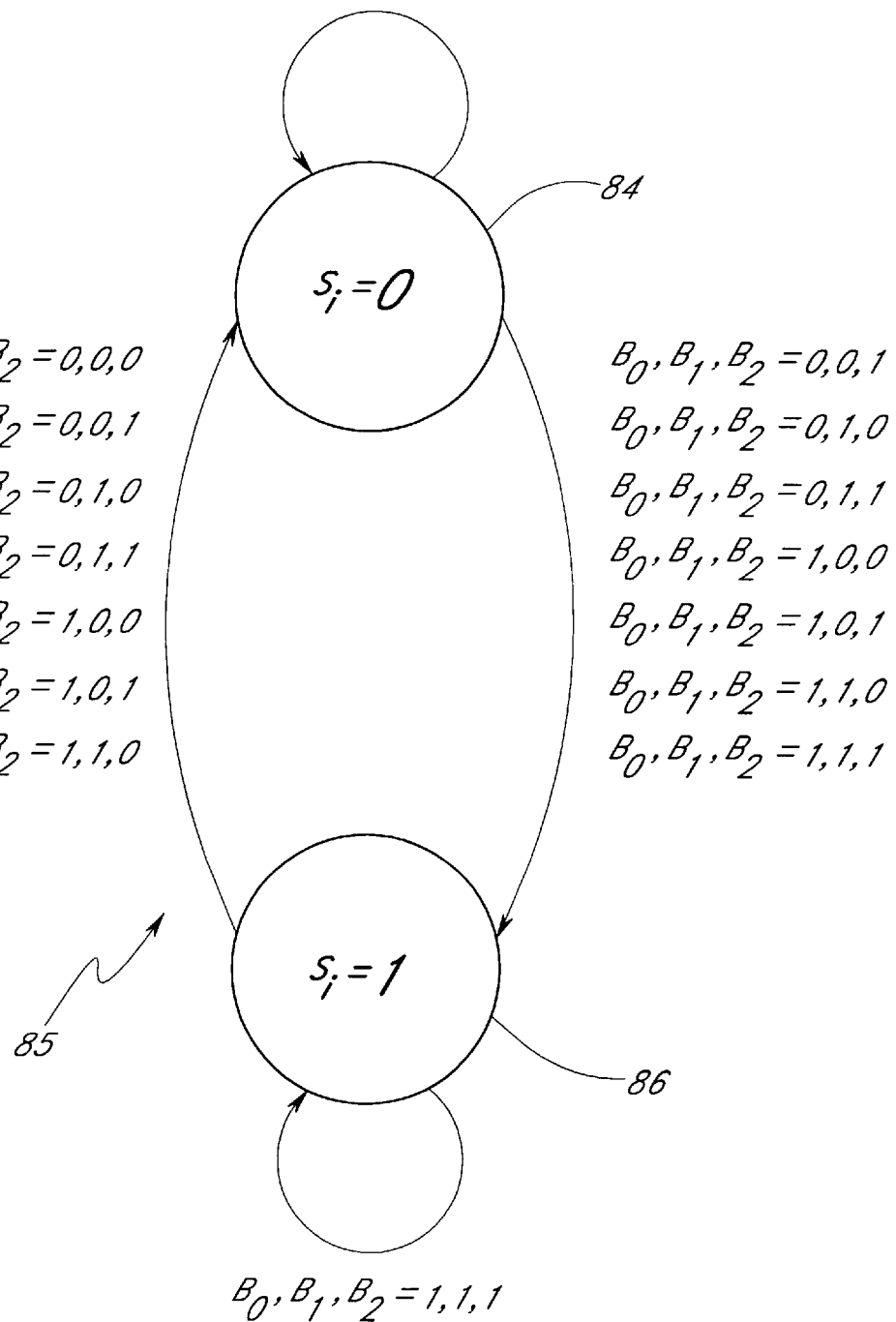
FIG. 4 is a state transition diagram of the operation of the decision circuit of the present invention.

FIG. 4 is an illustration of a state table 85 that implements the decision logic outlined above. When the previously determined value is a 0, the state machine 85 is at a first state 84. When the previously determined value is a 1, the state machine 85 is at a second state 86. The state machine 85 transitions from the first state 84 to the second state 86 when any input sample contains a 1. The state machine 85 transitions from the second state 86 to the first state 84 when any input sample contains a 0. The state machine 85 remain in the first state 84 when the input sample is 0,0,0. The state machine 85 remains in the second state 86 when the input sample is 1,1,1.

Figure 5:
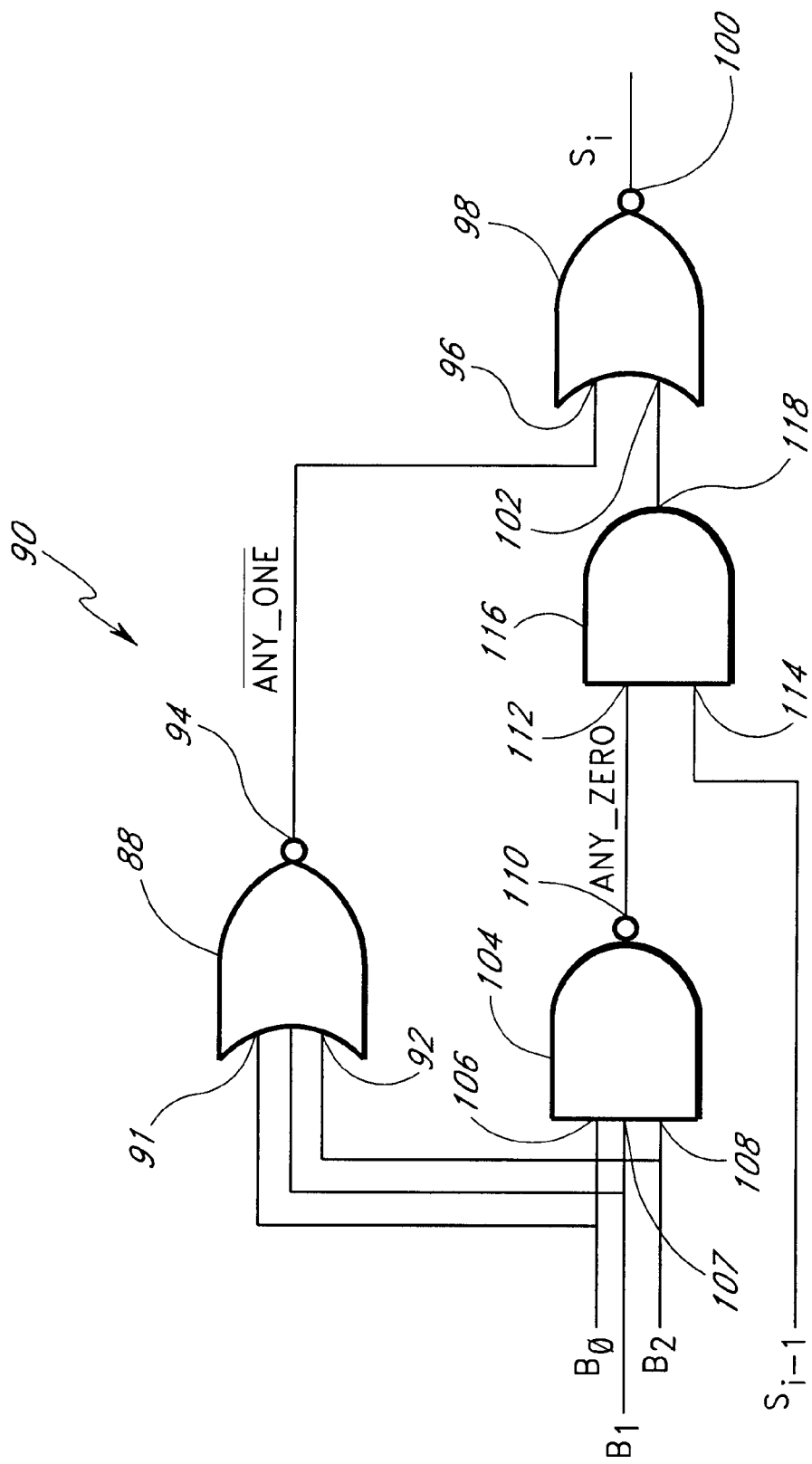
FIG. 5 illustrates a logic gate implementation of the state transition diagram of FIG. 4.

FIG. 5 is a logic diagram of a decision circuit 90 that is configured to implement the state table 85 of FIG. 4. The decision circuit 90 includes a first three input NAND gate 104 having inputs 106, 107, 108 connected to receive the values B0, B1, and B2, respectively, from each sample of the over-sampling circuit. An output 110 of the NAND gate 104 is a signal ANY_ZERO which is high (i.e., a logical 1) when the level on any of the input lines 106, 107, 108 is a zero. Thus, the NAND gate 104 serves as a zero detector.

A two-input AND gate 116 has a first input 112 coupled to the output 110 of the NAND gate 104. A second input 114 of the AND gate 116 is coupled to a latch 152 (FIG. 6) that stores the previously determined value of the receiving circuit as a value $S_{i-1}$.

An output 118 of the AND gate 116 is coupled to a first input 102 of a first two-input NOR gate 98. The output 100 of the first NOR gate 98 is provided as the new output value of the receiving circuit, designated as $S_i$. A second input 96 of the first NOR gate 98 is coupled to an output 94 of a second three-input NOR gate 88. The second NOR gate 88 has three inputs 91, 92, 93 that are coupled to the first value, B0, the second value, B1, and the last value, B2, respectively, from each sample of the over-sampling circuit. The output 94 of the second NOR gate 88 is an ANY_ONE signal which is active low (i.e., logical zero) when any of the samples B0, B2, B2 is a logical one. (The line across the top of the ANY_ONE signal indicates that it is an active low signal).

If all of the sample inputs are low, the ANY ONE signal on the output 94 of the second NOR gate 88 is high (i.e., logical 1), causing the input 96 of the first NOR gate 98 to be high. Therefore, the output 100 of the first NOR gate 98 is forced low to cause $S_i$ to be a 0, thus implementing the transition of the state table responsive to the 0,0,0 sample inputs.

If all the sample inputs are high, the ANY_ZERO signal on the output 110 of the NAND gate 104 is low, the ANY_ONE signal on the output 94 of the second NOR gate 88 is low, and the output 118 of the AND gate 116 is forced low. Therefore, both inputs of the first NOR gate 98 are low, and the signal Si on the output 100 of the first NOR gate 98 is forced high; thus, implementing the transitions of the state table responsive to the 1,1,1 sample inputs.

If any other combination of ones and zeros occurs (i.e., 001, 010, 011, 100, 101, 110), then the ANY_ONE signal on the output 94 of the second NOR gate 88 is low, causing the input 96 of the first NOR gate 98 to be low. The ANY_ZERO signal on the output 110 of the NAND gate 104 is high. The output 118 of the AND gate 116 and the input 102 of the first NOR gate 98 depend on the value of $S_{i-1}$ (i.e., the previously latched output value). In particular, if $S_{i-1}$ is a 1, then the output 118 of the AND gate 116 and the input 102 of the first NOR gate 98 are high, forcing the output 100 of the first NOR gate 98 to be low. If $S_{i-1}$ is a 0, then the output 118 of the AND gate 116 and the input 102 of the first NOR gate 98 are forced low, causing the output 100 of the first NOR gate 98 to be high. It can be seen that any combination of mixed ones and zeroes causes the next output state to be the opposite as the previous output state.

Figure 6:
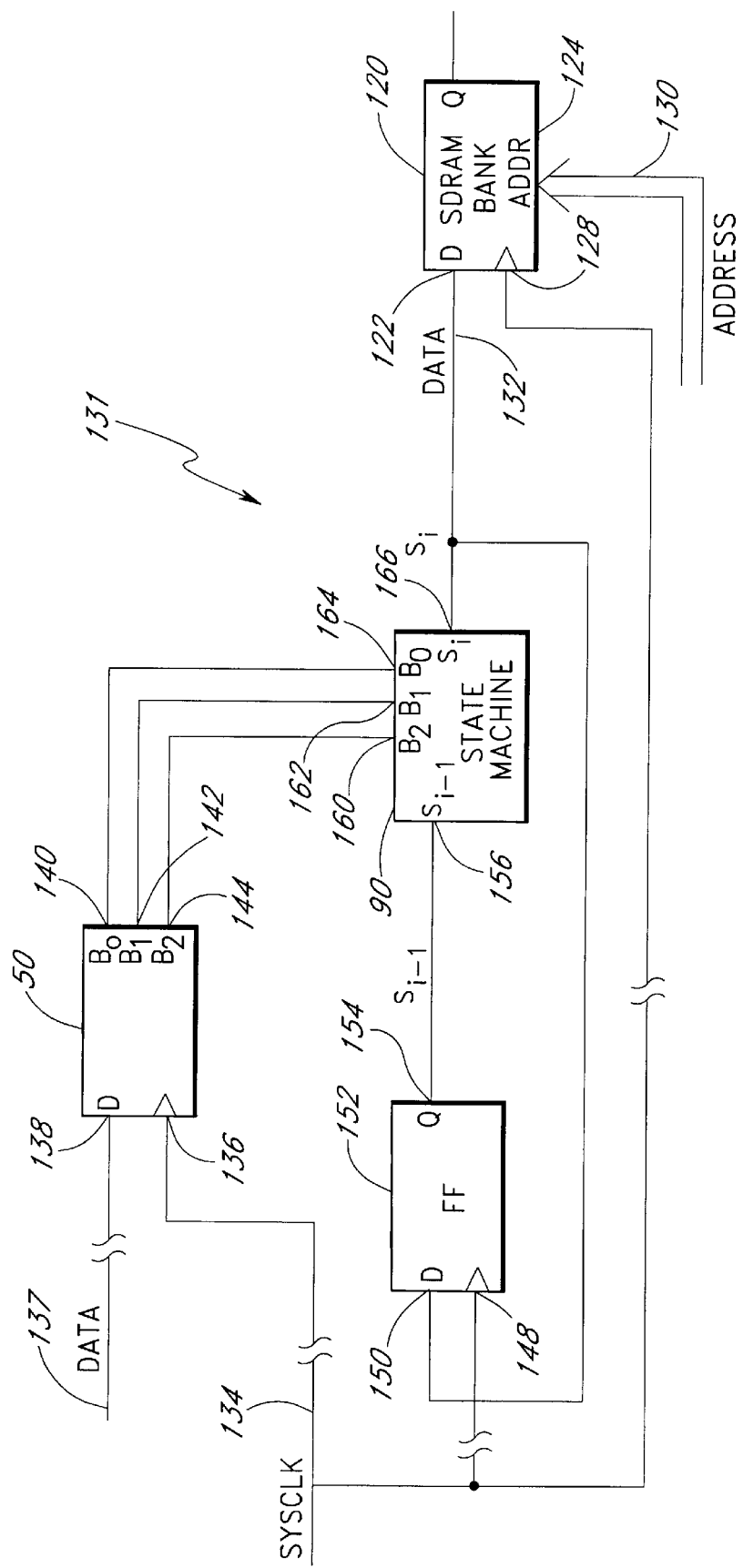
FIG. 6 illustrates the interconnection of a receiving circuit in accordance with the present invention and an SDRAM bank.

FIG. 6 illustrates a receiving circuit 131 arranged to receive data from a data line 137 and to provide the data to an SDRAM bank 120. The circuit of FIG. 6 includes the over-sampling circuit 50, the decision circuit 90, an SDRAM bank 120, and a flip-flop or latch 152. The data input 138 of the over-sampling circuit 50 is coupled to the data line 137. The clock input 136 of the over-sampling circuit 50 is coupled to the system clock signal line 134. The sample outputs 140, 142, 144 of the over-sampling circuit 50 are coupled to the data inputs 160, 162, 164 of the decision circuit 90, respectively. The output 166 of the decision circuit 90 is provided as the output of the receiving circuit 131. The data input 122 of the SDRAM bank 120 is coupled to the next state output ($S_i$) 166 of the decision circuit 90. The clock input 128 of the SDRAM bank 120 is coupled to the system clock signal line 134. The previous state input ($S_{i-1}$) 156 of the decision circuit 90 is coupled to the Q output 154 of the flip-flop 152. The data input 150 of the flip-flop 152 is coupled to the Si output 166 of the decision circuit 90. The clock input 148 of the flip-flop 152 is coupled to the system clock signal line 134. Although shown for only one bit of data, one skilled in the art will appreciate that the sample circuit and decision circuit are repeated for each data signal.

The circuit of the embodiment disclosed above employs an over-sampling circuit that provides three values in each sample. In other embodiments the circuit can be extended to employ an over-sampling circuit that provides a greater number of samples by adding delay elements and sample latches to the arrangement of FIG. 2. Similar state rules, used to construct the state machine of the illustrated embodiment, can be used to construct a state machine for any size input sample.

Although the receiving circuit described above employs the current sample and a previously determined value to determine the next value, other determination schemes may be employed with similar effectiveness. For example, the over-sampling circuit can store values for two system clock cycles such that sample values for two data values are available to the decision circuit. The decision circuit can then determine the value for the data corresponding to the previous clock cycle based on the current sample, previous sample, and the previously determined value.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is intended to be defined by the claims that follow.

What is claimed is:

1. A receiving circuit for receiving synchronous data from a data line, the data on the data line being synchronized with a clock signal, the receiving circuit comprising:

an over-sampling circuit that samples the data at least two times in response to at least one edge of the clock signal, the circuit providing data samples to a decision circuit; and a decision circuit that determines the data levels provided on the data line by reference to the samples from the over-sampling circuit, and the previous level determined by the decision circuit.

2. The receiving circuit of claim 1, wherein the determination of the data level to receive is based on the previously determined data level, the previous sample, and the current sample.

3. The receiving circuit of claim 1, wherein the output of the receiving circuit is coupled to an input of an SDRAM.

4. The receiving circuit of claim 1, wherein the input of the receiving circuit is coupled to the output of an SDRAM.

5. The receiving circuit of claim 1, wherein the sampling circuit provides a sample that includes the state of the data signal during three time intervals.

6. A receiving circuit for receiving synchronous data from a data line, the data on the data line being synchronized with a clock signal, the receiving circuit comprising:

an over-sampling circuit that samples the data at least two times in response to at least one edge of the clock signal, the circuit providing data samples to a decision circuit; and a decision circuit that determines the data levels provided on the data line by reference to the samples from the over-sampling circuit, and by reference to a previously determined level, wherein the decision circuit provides an output level that is the opposite of the previously determined level when any data sample is at a level that is the opposite of the previously determined level.

7. A method of receiving synchronous data, comprising:

sampling the data level of a data signal line at least two times in response to a sampling edge of a clock signal; and determining at least one data value based on the sampled levels and a previous determination.

8. The method of claim 7, wherein the determination result is provided to an input of an SDRAM.

9. The method of claim 7, wherein the sampled levels are taken from the output of an SDRAM.

10. The method of claim 7, wherein the sampled levels are of a data signal during three time intervals.

11. A method of receiving synchronous data, comprising:

sampling the data level of a data signal line three times in response to a sampling edge of a clock signal; and determining a data level to receive based on the sampled levels and a previously determined level, wherein said determined data level is the opposite of the previously determined level when any sampled level is at a level that is the opposite of the previously determined level.

12. A receiving circuit that receives data from a data signal line, the receiving circuit comprising:

a latch having a data input, a clock input, and a data output, the data input coupled to the data signal line, the clock input coupled to the system clock signal line, the data output providing a first over-sampled output;

at least one additional latch having a data input, a clock input, and a data output, the data input coupled to the data signal line, the clock input coupled to the system signal line by a delay element, the data output providing a second output of an over-sampling circuit; and a determining circuit that receives said first over-sampled output and said second over-sampled output and that determines an output data level based on said first over-sampled output and said second over-sampled output and based on at least one previous output data level.

13. A receiving circuit, comprising:

means for over-sampling data and to provide over-sampled output data; and means for receiving said over-sampled data and for determining a receiving circuit output data level by using said over-sampled data and a previous receiving circuit output data level.

* * * * *